United States Patent
Kim et al.

(10) Patent No.: US 10,373,025 B1
(45) Date of Patent: Aug. 6, 2019

(54) METHOD AND DEVICE FOR VERIFYING INTEGRITY OF PARAMETERS OF CNN BY USING TEST PATTERN TO ENHANCE FAULT TOLERANCE AND FLUCTUATION ROBUSTNESS IN EXTREME SITUATIONS FOR FUNCTIONAL SAFETY

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: Stradvision, INC., Gyeongbuk (KR)

( * ) Notice: Subject to any disclaimer, the term of this patent is extended or adjusted under 35 U.S.C. 154(b) by 0 days.

(21) Appl. No.: 16/258,837

(22) Filed: Jan. 28, 2019

(51) Int. Cl.
*G06K 9/62* (2006.01)
*G06K 9/66* (2006.01)
*G06N 3/08* (2006.01)

(52) U.S. Cl.
CPC ......... *G06K 9/6262* (2013.01); *G06K 9/6202* (2013.01); *G06K 9/6256* (2013.01); *G06K 9/66* (2013.01); *G06N 3/08* (2013.01)

(58) Field of Classification Search
CPC ...... G06K 9/66; G06K 9/6262; G06K 9/6202; G06N 3/08
(Continued)

(56) References Cited

U.S. PATENT DOCUMENTS

| | | | |
|---|---|---|---|
| 10,108,850 B1 * | 10/2018 | Das | G06K 9/00288 |
| 2018/0208284 A1 * | 7/2018 | Kang | B63C 11/52 |
| 2018/0299841 A1 * | 10/2018 | Appu | G05B 13/027 |

OTHER PUBLICATIONS

Pei, et al. "Towards Practical Verification of Machine Learning: The Case of Computer Vision Systems", pp. 1-16, Columbia University. (Year: 2017).*

(Continued)

*Primary Examiner* — Daniel G Mariam
(74) *Attorney, Agent, or Firm* — FisherBroyles, LLP; Susan M. Oiler

(57) ABSTRACT

A method for verifying an integrity of one or more parameters of a convolutional neural network (CNN) by using at least one test pattern to be added to at least one original input is provided for fault tolerance, fluctuation robustness in extreme situations, functional safety on the CNN, and annotation cost reduction. The method includes steps of: (a) a computing device instructing at least one adding unit to generate at least one extended input by adding the test pattern to the original input; (b) the computing device instructing the CNN to generate at least one output for verification by applying one or more convolution operations to the extended input; and (c) the computing device instructing at least one comparing unit to verify the integrity of the parameters of the CNN by determining a validity of the output for verification with reference to at least one output for reference.

16 Claims, 4 Drawing Sheets

(58) Field of Classification Search
USPC .......................................................... 382/159
See application file for complete search history.

(56) References Cited

OTHER PUBLICATIONS

Dreossi, et al. "Systematic Testing of Convolutional Neural Networks for Autonomous Driving", pp. 1-5, International Conference on Machine Learning. (Year: 2017).*
He, et al. "VerIDeep: Verifying Integrity of Deep Neural Networks through Sensitive-Sample Fingerprinting", pp. 1-15, Princeton University. (Year: 2018).*

* cited by examiner

METHOD AND DEVICE FOR VERIFYING INTEGRITY OF PARAMETERS OF CNN BY USING TEST PATTERN TO ENHANCE FAULT TOLERANCE AND FLUCTUATION ROBUSTNESS IN EXTREME SITUATIONS FOR FUNCTIONAL SAFETY

FIELD OF THE DISCLOSURE

The present disclosure relates to a method and a computing device for use with an autonomous vehicle; and more particularly, to the method and the computing device for verifying an integrity of parameters of a CNN by using a test pattern.

BACKGROUND OF THE DISCLOSURE

Deep Convolution Neural Networks (Deep CNNs) are at the heart of the remarkable development in deep learning. CNNs have already been used in the 90's to solve the problems of character recognition, but their use has become as widespread as it is now thanks to recent research. These CNNs won the 2012 ImageNet image classification tournament, crushing other competitors. Then, the convolution neural network became a very useful tool in the field of the machine learning.

The CNNs are sometimes used in a field of autonomous driving of a vehicle. That is, the vehicle can be safely driven via a function of detecting obstacles, free spaces, and the like by analyzing images obtained with a camera attached to the vehicle.

It is security of the CNNs for the autonomous driving that should be considered to be very important when the CNNs are actually used for the autonomous driving. As the autonomous vehicle with heavy weight moves at high speeds, the risk is high in case of an erroneous driving. Specifically, if a hacker with a bad intention falsifies parameters of the CNNs for the autonomous driving by hacking the CNNs, the autonomous vehicle may be used for terrorism.

Therefore, it is necessary to verify whether the parameters of the CNN during a test process are same as those of the CNN at the time when the CNN has completed its learning process. Researches so far have been focused mainly on how many effects the CNNs can have on driving the vehicle, and there is little research on how to maintain the security.

SUMMARY OF THE DISCLOSURE

It is an object of the present disclosure to solve all the aforementioned problems.

It is another object of the present disclosure to secure autonomous driving of a vehicle against hackers through a method for verifying an integrity of one or more parameters of a convolutional neural network (CNN) by using at least one test pattern.

In accordance with one aspect of the present disclosure, there is provided a method for verifying an integrity of one or more parameters of a convolutional neural network (CNN) by using at least one test pattern to be added to at least one original input, including steps of: (a) a computing device, if the test pattern is acquired, instructing at least one adding unit to generate at least one extended input by adding the test pattern to the original input; (b) the computing device instructing the CNN to generate at least one output for verification by applying one or more convolution operations to the extended input; and (c) the computing device instructing at least one comparing unit to verify the integrity of the parameters of the CNN by determining a validity of the output for verification with reference to at least one output for reference.

As one example, at the step of (a), the computing device instructs the adding unit to add at least one zero pattern to the original input and add the test pattern so that the zero pattern is located between the original input and the test pattern.

As one example, at the step of (c), the computing device instructs the comparing unit to compare each of one or more first values included in the output for reference and each of their corresponding second values included in at least one specific area, which corresponds to the test pattern, among a whole area of the output for verification and, if at least one of the first values included in the output for reference is not identical to its corresponding second value included in the specific area, the computing device instructs the comparing unit to determine that the output for verification is invalid and that at least part of the parameters have one or more errors.

As one example, at the step of (c), the computing device instructs the comparing unit (i) to generate each of one or more representative values for verification corresponding to each of one or more values included in each channel of at least one specific area, which corresponds to the test pattern, among a whole area of the output for verification, (ii) to compare each of the representative values for verification per said each channel of the specific area and each of one or more representative values for reference per each channel of the output for reference, and (iii), if at least one of the representative values for reference is not identical to its corresponding one of the representative values for verification, to determine that the output for verification is invalid and that at least part of the parameters have one or more errors.

As one example, before the step of (a), if a security level of the CNN is higher than a threshold level, the computing device instructs the CNN to generate the output for reference by applying the convolution operations to the test pattern.

In accordance with another aspect of the present disclosure, there is provided a method for verifying an integrity of one or more parameters of a convolutional neural network (CNN) by using at least one sub-test pattern to be added to at least one original input, including steps of: (a) a computing device, if the sub-test pattern which has a same size as a convolution kernel of the CNN included in the computing device is acquired, instructing at least one adding unit to generate at least one extended input by repeating a process of adding the sub-test pattern to the original input; (b) the computing device instructing the CNN to generate at least one output for verification by applying one or more convolution operations to the extended input; and (c) the computing device instructing at least one comparing unit to verify the integrity of the parameters of the CNN by determining a validity of the output for verification with reference to each of one or more sub-outputs for verification, corresponding to the sub-test pattern, included in the output for verification.

As one example, each of the sub-outputs for verification includes at least one of a verifying region and a non-verifying region, and, at the step of (c), the computing device instructs the comparing unit to compare among verifying values located at a same relative position on verifying region included in the sub-outputs for verification and, if at least one of the verifying values is not identical with one another, the computing device instructs the comparing unit to determine that the output for verification is invalid and that at least part of the parameters have one or more errors.

As one example, a location of the verifying region and that of the non-verifying region on each of the sub-outputs for verification are determined according to a location of the sub-test pattern on the extended input.

In accordance with still another aspect of the present disclosure, there is provided a computing device for verifying an integrity of one or more parameters of a convolutional neural network (CNN) by using at least one test pattern to be added to at least one original input, including: at least one memory that stores instructions; and at least one processor configured to execute the instructions to perform processes of: (I) instructing at least one adding unit to generate at least one extended input by adding the test pattern to the original input, (II) instructing the CNN to generate at least one output for verification by applying one or more convolution operations to the extended input, and (III) instructing at least one comparing unit to verify the integrity of the parameters of the CNN by determining a validity of the output for verification with reference to at least one output for reference.

As one example, at the process of (I), the processor instructs the adding unit to add at least one zero pattern to the original input and add the test pattern so that the zero pattern is located between the original input and the test pattern.

As one example, at the process of (III), the processor instructs the comparing unit to compare each of one or more first values included in the output for reference and each of their corresponding second values included in at least one specific area, which corresponds to the test pattern, among a whole area of the output for verification and, if at least one of the first values included in the output for reference is not identical to its corresponding second value included in the specific area, the processor instructs the comparing unit to determine that the output for verification is invalid and that at least part of the parameters have one or more errors.

As one example, at the process of (III), the processor instructs the comparing unit (i) to generate each of one or more representative values for verification corresponding to each of one or more values included in each channel of at least one specific area, which corresponds to the test pattern, among a whole area of the output for verification, (ii) to compare each of the representative values for verification per said each channel of the specific area and each of one or more representative values for reference per each channel of the output for reference, and (iii), if at least one of the representative values for reference is not identical to its corresponding one of the representative values for verification, to determine that the output for verification is invalid and that at least part of the parameters have one or more errors.

As one example, before the process of (I), if a security level of the CNN is higher than a threshold level, the processor instructs the CNN to generate the output for reference by applying the convolution operations to the test pattern.

In accordance with still yet another aspect of the present disclosure, there is provided a computing device for verifying an integrity of one or more parameters of a convolutional neural network (CNN) by using at least one sub-test pattern to be added to at least one original input, including: at least one memory that stores instructions; and at least one processor configured to execute the instructions to perform processes of: (I) if the sub-test pattern which has a same size as a convolution kernel of the CNN included in the computing device is acquired, instructing at least one adding unit to generate at least one extended input by repeating a process of adding the sub-test pattern to the original input, (II) instructing the CNN to generate at least one output for verification by applying one or more convolution operations to the extended input, and (III) instructing at least one comparing unit to verify the integrity of the parameters of the CNN by determining a validity of the output for verification with reference to each of one or more sub-outputs for verification, corresponding to the sub-test pattern, included in the output for verification.

As one example, each of the sub-outputs for verification includes at least one of a verifying region and a non-verifying region, and, at the process of (III), the processor instructs the comparing unit to compare among verifying values located at a same relative position on verifying region included in the sub-outputs for verification and, if at least one of the verifying values is not identical with one another, the processor instructs the comparing unit to determine that the output for verification is invalid and that at least part of the parameters have one or more errors.

As one example, a location of the verifying region and that of the non-verifying region on each of the sub-outputs for verification are determined according to a location of the sub-test pattern on the extended input.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION

Figure 1:
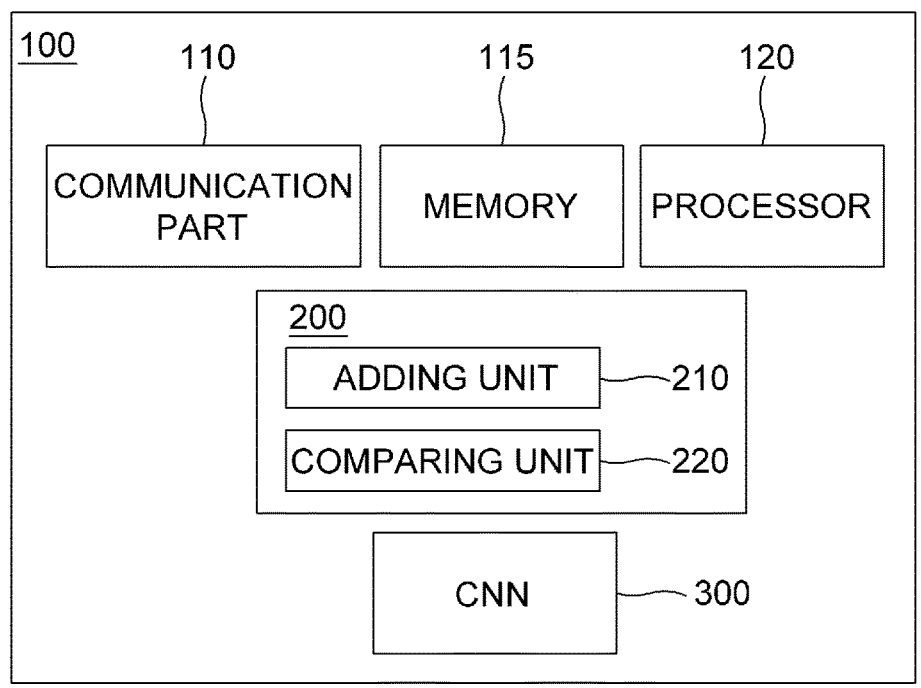
FIG. 1 is a drawing schematically illustrating a configuration of a computing device performing a method for verifying an integrity of one or more parameters of a convolutional neural network (CNN) by using at least one test pattern in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

FIG. 1 is a drawing schematically illustrating a configuration of a computing device performing a method for verifying an integrity of one or more parameters of a convolutional neural network (CNN) by using at least one test pattern in accordance with one example embodiment of the present disclosure.

By referring to FIG. 1, the computing device 100 may include the CNN 300, and at least one adding unit 210 and at least one comparing unit 220 which are included in at least one integrity verification module 200. Inputting/outputting processes and operation processes of the adding unit 210, the comparing unit 220, and the CNN 300 may be performed by at least one communication part 110 and at least one processor 120, respectively. In FIG. 1, however, a detailed connection between the communication part 110 and the processor 120 is omitted. Herein, at least one memory 115 may have stored instructions to be stated later, and the processor 120 may be configured to execute the instructions stored in the memory 115 and may implement the present disclosure by performing processes to be explained below. Though the computing device 100 is described as above, it is not excluded that the computing device 100 includes at least one integrated processor in an integrated form of a medium, the processor, and the memory for implementing the present disclosure.

The overall configuration of the computing device 100 has been described above. Hereinafter, the method for verifying the integrity of the parameters of the CNN by using the test pattern in accordance with one embodiment of the present disclosure will be explained as follows.

Figure 2:
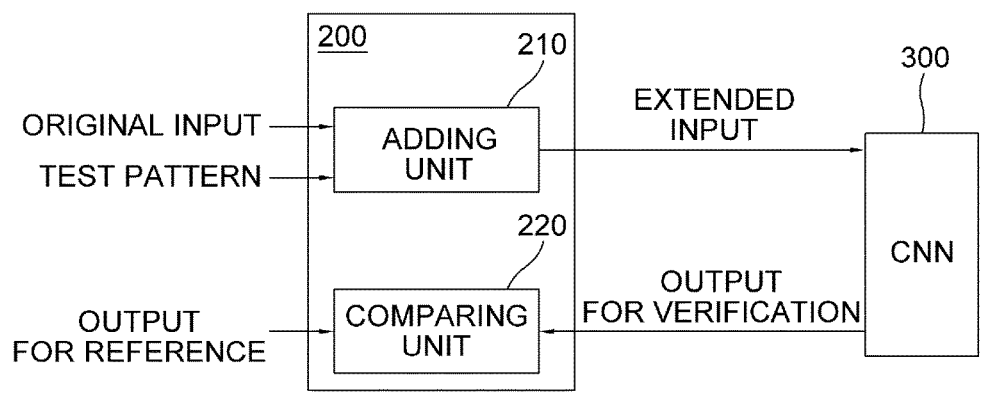
FIG. 2 is a flow chart schematically illustrating the method for verifying the integrity of the parameters of the CNN by using the test pattern in accordance with one example embodiment of the present disclosure.

FIG. 2 is a flow chart schematically illustrating the method for verifying the integrity of the parameters of the CNN by using the test pattern in accordance with said one example embodiment of the present disclosure.

By referring to FIG. 2, the adding unit 210 may generate at least one extended input by using at least one original input and the test pattern, the CNN 300 may generate at least one output for verification by using the extended input, and the comparing unit 220 may determine the integrity of the parameters of the CNN by using the output for verification and at least one output for reference.

Specifically, if the test pattern and the original input are acquired, the computing device 100 may instruct the adding unit 210 to generate the extended input by adding the test pattern to the original input.

Herein, the adding unit 210 and the comparing unit 220 may be included in the integrity verification module 200 capable of verifying the integrity of the CNN 300. The adding unit 210 may perform a function of adding the test pattern to the original input as stated above. In detail, the adding unit 210 may firstly add at least one zero pattern to the original input and then may add the test pattern so that the zero pattern is located between the original input and the test pattern.

If the extended input is generated by adding the test pattern directly to the original input without the zero pattern, and if the CNN applies one or more convolution operations to the extended input image without the zero pattern, the test pattern may affect a result of the convolution operations on the original input because values of multiple pixels are calculated simultaneously in the convolution operations by using a convolution kernel of N×N size. This is the reason why the zero pattern is added. A thickness of the zero pattern may be set such that the test pattern cannot affect the result of the convolution operations on the original input. As one example, the thickness may be set by dividing a size of the convolution kernel by 2 and by rounding down to a nearest integer.

If the extended input is generated as stated above, the computing device 100 may instruct the CNN 300 to generate the output for verification by applying the convolution operations to the extended input. The parameters of the CNN 300 may have been learned previously. Herein, at least one specific area, corresponding to the test pattern as a part of the extended input, among a whole area of the output for verification may be used to determine whether the parameters have been falsified, while the rest area among the whole area may correspond to the original input and may be used according to a main purpose, e.g., analyzing obtained images, of the CNN 300. The comparing unit 220 to be described later may calculate the specific area corresponding to the test pattern. The output for verification will be described by referring to FIG. 3.

Figure 3:
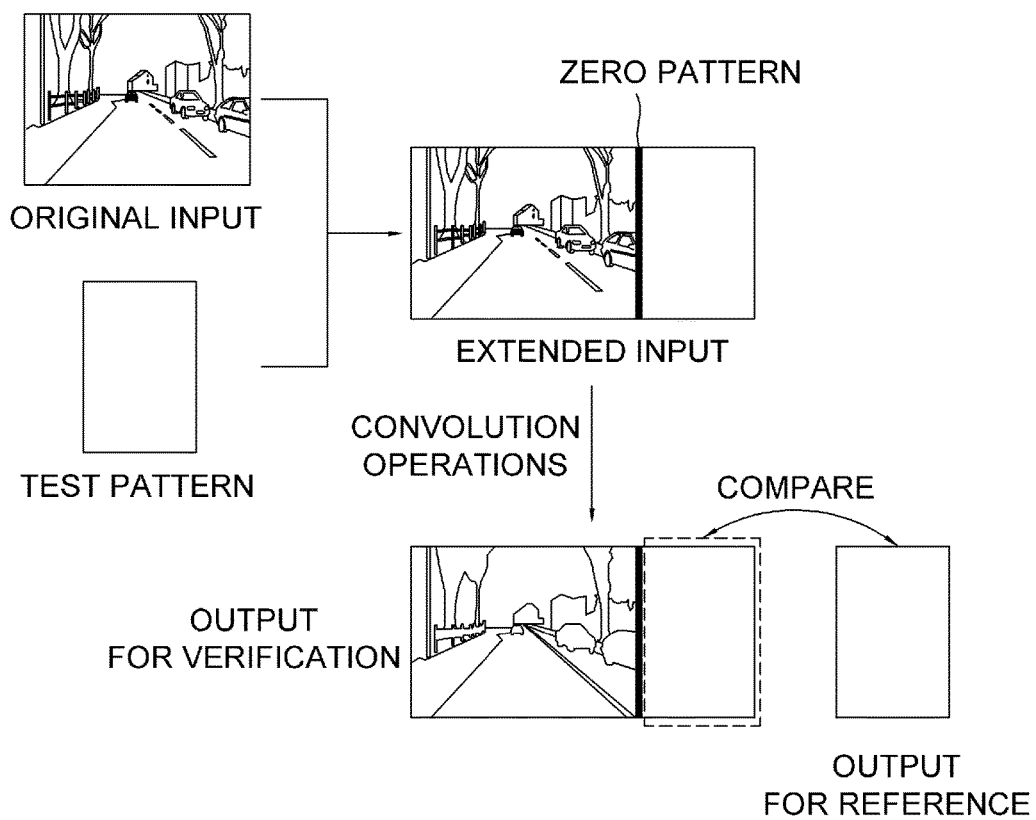
FIG. 3 is a drawing schematically illustrating at least one extended input and at least one output for verification generated to be used for the method for verifying the integrity of the parameters of the CNN by using the test pattern in accordance with one example embodiment of the present disclosure.

FIG. 3 is a drawing schematically illustrating the extended input and the output for verification generated to be used for the method for verifying the integrity of the parameters of the CNN by using the test pattern in accordance with said one example embodiment of the present disclosure.

By referring to FIG. 3, it can be seen that the extended input is generated by adding the test pattern and the zero pattern to the original input. Also, it can be seen that the output for verification is generated by applying the convolution operations of the CNN 300 to the extended input.

Then, the computing device 100 may instruct the comparing unit 220 to verify the integrity of the parameters of the CNN 300 by determining a validity of the output for verification with reference to the output for reference.

Herein, the output for reference is generated in advance by applying the convolution operations to the test pattern, when a security level of the CNN is higher than a threshold level before a process for verifying the integrity of the parameters is performed by using the integrity verification module 200.

Since the method in accordance with said one embodiment of the present disclosure may be performed to determine whether the parameters have been falsified due to an arbitrary factor including an attack of a hacker, the output for reference may need to be generated when the integrity of the parameters is guaranteed. Therefore, the output for reference may be generated by the CNN 300, when the security level is higher than the threshold level.

The output for reference may be compared with the specific area, corresponding to the test pattern, among the whole area of the output for verification, to thereby determine the integrity of the parameters of the CNN. That is, the computing device 100 may instruct the comparing unit 220 to compare each of one or more first values included in the output for reference and each of their corresponding second values included in the specific area, which corresponds to the test pattern, among the whole area of the output for verification. Next, if at least one of the first values included in the output for reference is not identical to its corresponding second value included in the specific area, the output for verification may be determined to be invalid, and at least part of the parameters may be determined to have one or more errors.

The output for reference may be a result of applying the convolution operations to the test pattern by the CNN 300 on the condition that the integrity of the parameters is guaranteed. Thus, if at least one of the first values is not identical to its corresponding second value, it may be determined that at least part of the parameters have been falsified.

Hereinbefore, the method for verifying the integrity of the parameters by using the test pattern has been described in accordance with said one example embodiment of the present disclosure. A method for optimizing consumption of computing resources will be explained below.

First of all, a method of optimizing storages for storing the test pattern and the output for reference is explained as follows. The test pattern may need to have a same number of channels as the original input. If different values are set for all the channels of the test pattern, a lot of data storage may be required. However, to verify the integrity of the parameters of the CNN, identical values may be allowed to be included to every channel of the test pattern with no need for different values to be included in each of the channels. Thus, pattern values for one of the channels of the test pattern may be generated and stored, and the pattern values may be used for each of the channels of the test pattern. Herein, channels included in the output for reference may have identical values which are determined by using values of a channel thereamong. In this method, the storages for storing the test pattern and the output for reference may be optimized.

Also, a method of optimizing storages for storing the output for reference may be explained as follows. Basically, the output for reference may need to have a same size as a result of the convolution operations on the test pattern. The storages for storing the output for reference may be optimized by storing only one or more representative values for reference which are acquired by using at least some of the first values included in the output for reference. That is, each of representative values for reference may be stored per each channel of the output for reference. Further, in the process of verifying the integrity, the computing device may instruct the comparing unit 220 to generate each of one or more representative values for verification of the second values per each channel of the specific area, which corresponds to the test pattern, among the whole area of the output for verification, and to verify the integrity by comparing each of the representative values for verification per said each channel of the specific area and each of their corresponding representative values for reference per each channel of the output for reference. For instance, the representative values for reference and the representative values for verification may be generated by using CRC or Hash, but the scope of the present disclosure is not limited thereto.

On the contrary, there is another embodiment for verifying the integrity by optimizing the data storage without using the output for reference.

In this embodiment, at least one sub-test pattern which has a same size as the convolution kernel of the CNN 300 may be acquired. How the sub-test pattern having the same size as the convolution kernel works will be described in detail later.

The computing device 100 may instruct the adding unit 210 to generate at least one extended input by repeating a process of adding the sub-test pattern to the original input. Next, the CNN 300 may be instructed to generate at least one output for verification by applying the convolution operations to the extended input. Further, the comparing unit 220 may be instructed to verify the integrity of the parameters of the CNN 300 by determining a validity of the output for verification with reference to each of one or more sub-outputs for verification, corresponding to the sub-test pattern, included in the output for verification.

Figure 4:
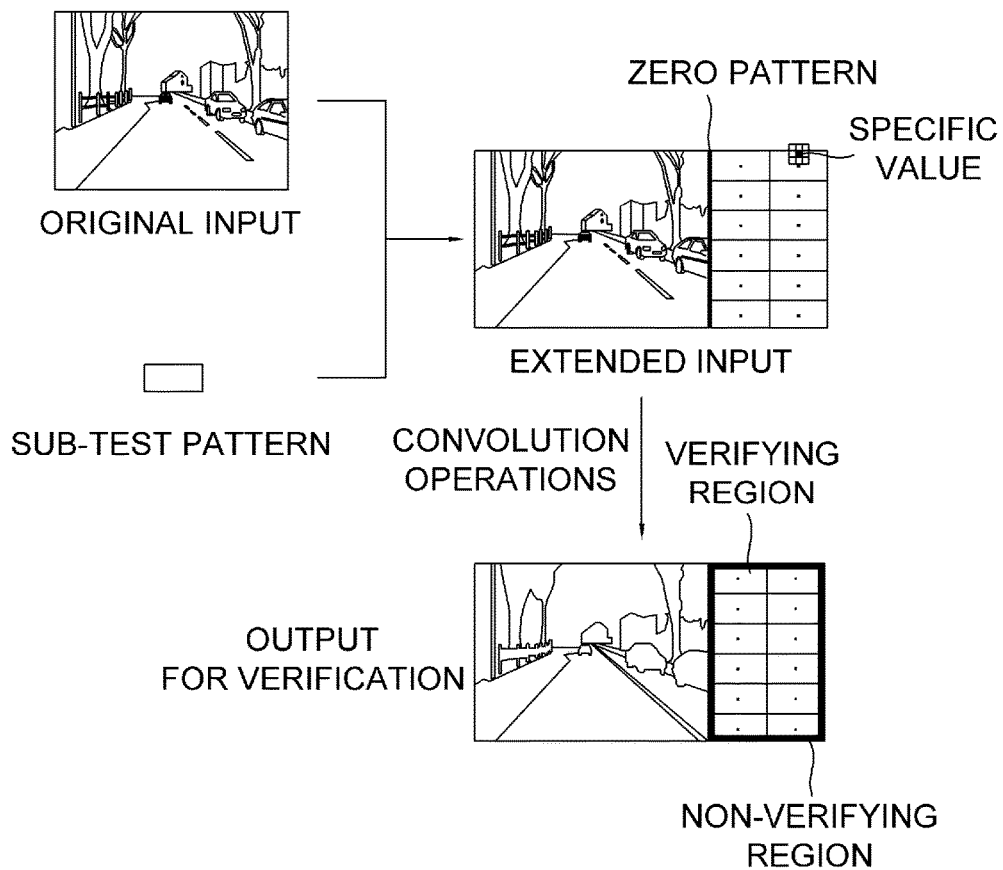
FIG. 4 is a drawing schematically illustrating at least one extended input and at least one output for verification, including one or more sub-outputs for verification, generated to be used for the method for verifying the integrity of the parameters of the CNN by using at least one sub-test pattern in accordance with another example embodiment of the present disclosure.

Herein, each of the sub-outputs for verification may include at least part of a verifying region and a non-verifying region. Such regions may be generated because multiple values are calculated simultaneously in the convolution operations. That is, the non-verifying region may be generated because dummy values are used instead of valid values when the convolution operations are applied by using values of pixels included in boundary areas of the extended input. FIG. 4 is referred to so as to explain this.

FIG. 4 is a drawing schematically illustrating the extended input and the output for verification, including the sub-outputs for verification, generated to be used for the method for verifying the integrity of the parameters of the CNN by using the sub-test pattern in accordance with said another example embodiment of the present disclosure.

By referring to FIG. 4, the extended input may be generated by adding the zero pattern at a location between the original input and repeated sub-test patterns, and the output for verification may be generated by applying the convolution operations of the CNN 300 to the extended input. Hereinafter, an issue regarding the non-verifying region may be described by referring to a process of the convolution operations on the sub-test pattern by using a specific value included in the sub-test pattern.

If the convolution kernel has a size of 3×3, as seen in FIG. 4, the convolution operations may be applied by using multiple values of pixels adjacent to the specific pixel including the specific value. Since there is no value included in the extended input above the specific value, the convolution operations are performed assuming that pixels of 0 value are located above the specific pixel including the specific value. Thus, as the values of the pixels included in the boundary areas of the extended input may use the dummy values treated as 0 during the convolution operations, the non-verifying region which can be seen in the output for verification of FIG. 4 may be generated.

A location of the verifying region and that of the non-verifying region on each of the sub-outputs for verification may be determined according to a location of the sub-test pattern on the extended input.

If the output for verification is generated as stated above, the computing device 100 may instruct the comparing unit 220 to compare among verifying values located at a same relative position on the verifying region included in the sub-outputs for verification and, if at least one of the verifying values is not identical with one another, the computing device may instruct the comparing unit 220 to determine that the output for verification is invalid and that at least part of the parameters have the errors.

By referring to FIG. 4 again, the verifying values, illustrated as dots in the sub-output for verification, may correspond to each other, because each of the verifying values is located in the center of each of the sub-output for verification. That is, the verifying values may have to be identical to each other, as each of the verifying values is a result of the convolution operations on the same test pattern. If at least one of the verifying values is not identical with one another, the parameters of the CNN may be determined to be falsified. Therefore, the integrity of the parameters may be verified through such processes.

Said another embodiment may be configured identically to the previous embodiment, except for acquirement of the output for reference shown in FIG. 2.

Through the method for verifying the integrity of the parameters of the CNN by using the test pattern or the sub-test pattern in accordance with the present disclosure, security may be guaranteed when the CNN is used for autonomous driving.

The present disclosure has an effect of securing the autonomous driving of a vehicle against the hacker through the method for verifying the integrity of the parameters of the CNN by using the test pattern.

Further, the method in accordance with the present disclosure may be used to enhance fault tolerance and fluctuation robustness in extreme situations for functional safety on the CNN, and may be used to reduce annotation costs.

It would be understood by one of ordinary skill in the art that a transmission and/or a reception of the above-described images such as the input image, the label image, and one or more additional labels can be performed by communication units of the learning device and the testing device, and processes of the convolution operation, the deconvolution operation, and the loss value operation can be mainly performed by processors of the learning device and the testing device, but the present disclosure is not limited to these examples.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for verifying an integrity of one or more parameters of a convolutional neural network (CNN) by using at least one test pattern to be added to at least one original input, comprising steps of:
   (a) a computing device, if the test pattern is acquired, instructing at least one adding unit to generate at least one extended input by adding the test pattern to the original input;
   (b) the computing device instructing the CNN to generate at least one output for verification by applying one or more convolution operations to the extended input; and
   (c) the computing device instructing at least one comparing unit to verify the integrity of the parameters of the CNN by determining a validity of the output for verification with reference to at least one output for reference.

2. The method of claim 1, wherein, at the step of (a), the computing device instructs the adding unit to add at least one zero pattern to the original input and add the test pattern so that the zero pattern is located between the original input and the test pattern.

3. The method of claim 1, wherein, at the step of (c), the computing device instructs the comparing unit to compare each of one or more first values included in the output for reference and each of their corresponding second values included in at least one specific area, which corresponds to the test pattern, among a whole area of the output for verification and, if at least one of the first values included in the output for reference is not identical to its corresponding second value included in the specific area, the computing device instructs the comparing unit to determine that the output for verification is invalid and that at least part of the parameters have one or more errors.

4. The method of claim 1, wherein, at the step of (c), the computing device instructs the comparing unit (i) to generate each of one or more representative values for verification corresponding to each of one or more values included in each channel of at least one specific area, which corresponds to the test pattern, among a whole area of the output for verification, (ii) to compare each of the representative values for verification per said each channel of the specific area and each of one or more representative values for reference per each channel of the output for reference, and (iii), if at least one of the representative values for reference is not identical to its corresponding one of the representative values for verification, to determine that the output for verification is invalid and that at least part of the parameters have one or more errors.

5. The method of claim 1, wherein, before the step of (a), if a security level of the CNN is higher than a threshold level, the computing device instructs the CNN to generate the output for reference by applying the convolution operations to the test pattern.

6. A method for verifying an integrity of one or more parameters of a convolutional neural network (CNN) by using at least one sub-test pattern to be added to at least one original input, comprising steps of:
  (a) a computing device, if the sub-test pattern which has a same size as a convolution kernel of the CNN included in the computing device is acquired, instructing at least one adding unit to generate at least one extended input by repeating a process of adding the sub-test pattern to the original input;
  (b) the computing device instructing the CNN to generate at least one output for verification by applying one or more convolution operations to the extended input; and
  (c) the computing device instructing at least one comparing unit to verify the integrity of the parameters of the CNN by determining a validity of the output for verification with reference to each of one or more sub-outputs for verification, corresponding to the sub-test pattern, included in the output for verification.

7. The method of claim 6, wherein each of the sub-outputs for verification includes at least one of a verifying region and a non-verifying region, and wherein, at the step of (c), the computing device instructs the comparing unit to compare among verifying values located at a same relative position on verifying region included in the sub-outputs for verification and, if at least one of the verifying values is not identical with one another, the computing device instructs the comparing unit to determine that the output for verification is invalid and that at least part of the parameters have one or more errors.

8. The method of claim 7, wherein a location of the verifying region and that of the non-verifying region on each of the sub-outputs for verification are determined according to a location of the sub-test pattern on the extended input.

9. A computing device for verifying an integrity of one or more parameters of a convolutional neural network (CNN) by using at least one test pattern to be added to at least one original input, comprising:
  at least one memory that stores instructions; and
  at least one processor configured to execute the instructions to perform processes of: (I) instructing at least one adding unit to generate at least one extended input by adding the test pattern to the original input, (II) instructing the CNN to generate at least one output for verification by applying one or more convolution operations to the extended input, and (III) instructing at least one comparing unit to verify the integrity of the parameters of the CNN by determining a validity of the output for verification with reference to at least one output for reference.

10. The computing device of claim 9, wherein, at the process of (I), the processor instructs the adding unit to add at least one zero pattern to the original input and add the test pattern so that the zero pattern is located between the original input and the test pattern.

11. The computing device of claim 9, wherein, at the process of (III), the processor instructs the comparing unit to compare each of one or more first values included in the output for reference and each of their corresponding second values included in at least one specific area, which corresponds to the test pattern, among a whole area of the output for verification and, if at least one of the first values included in the output for reference is not identical to its corresponding second value included in the specific area, the processor instructs the comparing unit to determine that the output for verification is invalid and that at least part of the parameters have one or more errors.

12. The computing device of claim 9, wherein, at the process of (III), the processor instructs the comparing unit (i) to generate each of one or more representative values for verification corresponding to each of one or more values included in each channel of at least one specific area, which corresponds to the test pattern, among a whole area of the output for verification, (ii) to compare each of the representative values for verification per said each channel of the specific area and each of one or more representative values for reference per each channel of the output for reference, and (iii), if at least one of the representative values for reference is not identical to its corresponding one of the representative values for verification, to determine that the output for verification is invalid and that at least part of the parameters have one or more errors.

13. The computing device of claim 9, wherein, before the process of (I), if a security level of the CNN is higher than a threshold level, the processor instructs the CNN to generate the output for reference by applying the convolution operations to the test pattern.

14. A computing device for verifying an integrity of one or more parameters of a convolutional neural network (CNN) by using at least one sub-test pattern to be added to at least one original input, comprising:
  at least one memory that stores instructions; and
  at least one processor configured to execute the instructions to perform processes of: (I) if the sub-test pattern which has a same size as a convolution kernel of the CNN included in the computing device is acquired, instructing at least one adding unit to generate at least one extended input by repeating a process of adding the sub-test pattern to the original input, (II) instructing the CNN to generate at least one output for verification by applying one or more convolution operations to the extended input, and (III) instructing at least one comparing unit to verify the integrity of the parameters of the CNN by determining a validity of the output for verification with reference to each of one or more sub-outputs for verification, corresponding to the sub-test pattern, included in the output for verification.

15. The computing device of claim 14, wherein each of the sub-outputs for verification includes at least one of a verifying region and a non-verifying region, and wherein, at the process of (III), the processor instructs the comparing unit to compare among verifying values located at a same relative position on verifying region included in the sub-outputs for verification and, if at least one of the verifying values is not identical with one another, the processor instructs the comparing unit to determine that the output for verification is invalid and that at least part of the parameters have one or more errors.

16. The computing device of claim 15, wherein a location of the verifying region and that of the non-verifying region on each of the sub-outputs for verification are determined according to a location of the sub-test pattern on the extended input.

* * * * *